(12) United States Patent
Zaiser

(10) Patent No.: US 10,544,877 B2
(45) Date of Patent: Jan. 28, 2020

(54) PRESSURE REGULATING VALVE WITH PRESSURE TRANSMISSION PIN

(71) Applicant: Robert Bosch GmbH, Stuttgart (DE)

(72) Inventor: Liebhart Zaiser, Karlstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/909,343

(22) Filed: Mar. 1, 2018

(65) Prior Publication Data
US 2018/0252330 A1 Sep. 6, 2018

(30) Foreign Application Priority Data
Mar. 1, 2017 (DE) .................. 10 2017 203 286

(51) Int. Cl.
| | | |
|---|---|---|
| *F16K 11/07* | (2006.01) | |
| *F16K 31/06* | (2006.01) | |
| *F16K 3/34* | (2006.01) | |
| *G05D 16/20* | (2006.01) | |

(52) U.S. Cl.
CPC ............ *F16K 31/0693* (2013.01); *F16K 3/34* (2013.01); *F16K 31/0613* (2013.01); *F16K 11/0716* (2013.01); *G05D 16/2024* (2019.01); Y10T 137/86702 (2015.04)

(58) Field of Classification Search
CPC .... F16K 31/0693; F16K 3/34; F16K 11/0716; F16K 31/0613; F16K 31/0606; F16K 31/0696; G05D 16/2024; Y10T 137/86622; Y10T 137/86702
USPC ..... 137/625.65, 625.68; 251/129.07, 129.08, 251/281
See application file for complete search history.

(56) References Cited

U.S. PATENT DOCUMENTS 4,662,605 A * 5/1987 Garcia ................ F16K 31/0613
   251/129.08
5,571,248 A    11/1996 Seetharaman et al.
5,577,534 A * 11/1996 Ward .................. F15B 13/0418
   137/596.17
(Continued)

FOREIGN PATENT DOCUMENTS

DE      4218894 A1 * 12/1992 ............ F15B 13/043
DE      4425843 A1 *  1/1996 .......... F15B 13/0402
(Continued)

*Primary Examiner* — Craig J Price
(74) *Attorney, Agent, or Firm* — Maginot, Moore & Beck LLP

(57) ABSTRACT

A pressure regulating valve includes a housing, control slide valve, coupling rod, armature, outlet port, and pressure transmission pin. The armature demarcates a first fluid space and a second fluid space from each other. The rod extends with a constant first outer cross-sectional shape in a direction of a longitudinal axis, and at least partially demarcates a third fluid space that fluidically connects the first fluid space to the outlet port. The pin extends with a constant second outer cross-sectional shape in the direction of the longitudinal axis, and at least partially delimits the third fluid space. The pin is positioned so that one end facing toward the armature projects into the control slide valve, and another end facing away from the armature is at least indirectly supported against the housing. A hydraulically effective area of the second shape is larger than a hydraulically effective area of the first shape.

17 Claims, 1 Drawing Sheet

(56) References Cited

U.S. PATENT DOCUMENTS

| | | | | |
|---|---|---|---|---|
| 5,853,028 | A * | 12/1998 | Ness | G05D 16/2024 137/625.65 |
| 6,202,697 | B1 * | 3/2001 | Oyama | B60T 8/3665 137/625.65 |
| 6,578,606 | B2 * | 6/2003 | Neuhaus | G05D 16/2024 137/625.65 |
| 6,968,816 | B2 * | 11/2005 | Isobe | F01L 1/022 123/90.12 |
| 7,131,410 | B2 * | 11/2006 | Kondo | F01L 1/3442 123/90.17 |
| 7,458,395 | B2 * | 12/2008 | Haynes | F16K 31/0606 137/625.65 |
| 8,006,719 | B2 * | 8/2011 | Nordstrom | F16K 31/0613 137/625.68 |
| 8,387,644 | B2 * | 3/2013 | Najmolhoda | F01L 1/34 123/90.17 |
| 8,607,823 | B2 * | 12/2013 | Fischer | F16K 11/0716 137/625.38 |
| 8,662,109 | B2 * | 3/2014 | Bill | F15B 13/0433 137/625.64 |
| 9,453,518 | B2 * | 9/2016 | Schulz | G05D 16/2013 |
| 10,054,241 | B2 * | 8/2018 | Hilzendegen | F16K 39/04 |
| 10,094,253 | B2 * | 10/2018 | Lappan | F04B 49/002 |
| 2004/0129322 | A1 * | 7/2004 | Chen | F16K 31/0613 137/625.65 |
| 2016/0017991 | A1 * | 1/2016 | Boban | F16H 61/30 137/625.18 |
| 2018/0100522 | A1 * | 4/2018 | Schmidt | F15B 11/16 |

FOREIGN PATENT DOCUMENTS

| | | | | |
|---|---|---|---|---|
| DE | 19932747 A1 * | 4/2000 | | F16H 61/0251 |
| DE | 102 41 449 A1 | 3/2004 | | |
| DE | 10 2005 058 846 A1 | 6/2007 | | |
| DE | 102012105972 B3 * | 10/2013 | | F01M 1/16 |
| DE | 10 2014 004 796 A1 | 10/2015 | | |
| DE | 10 2014 109 097 A1 | 12/2015 | | |
| EP | 1 076 278 A2 | 2/2001 | | |
| EP | 1 209 327 A2 | 5/2002 | | |
| EP | 2 960 561 A1 | 12/2015 | | |

* cited by examiner

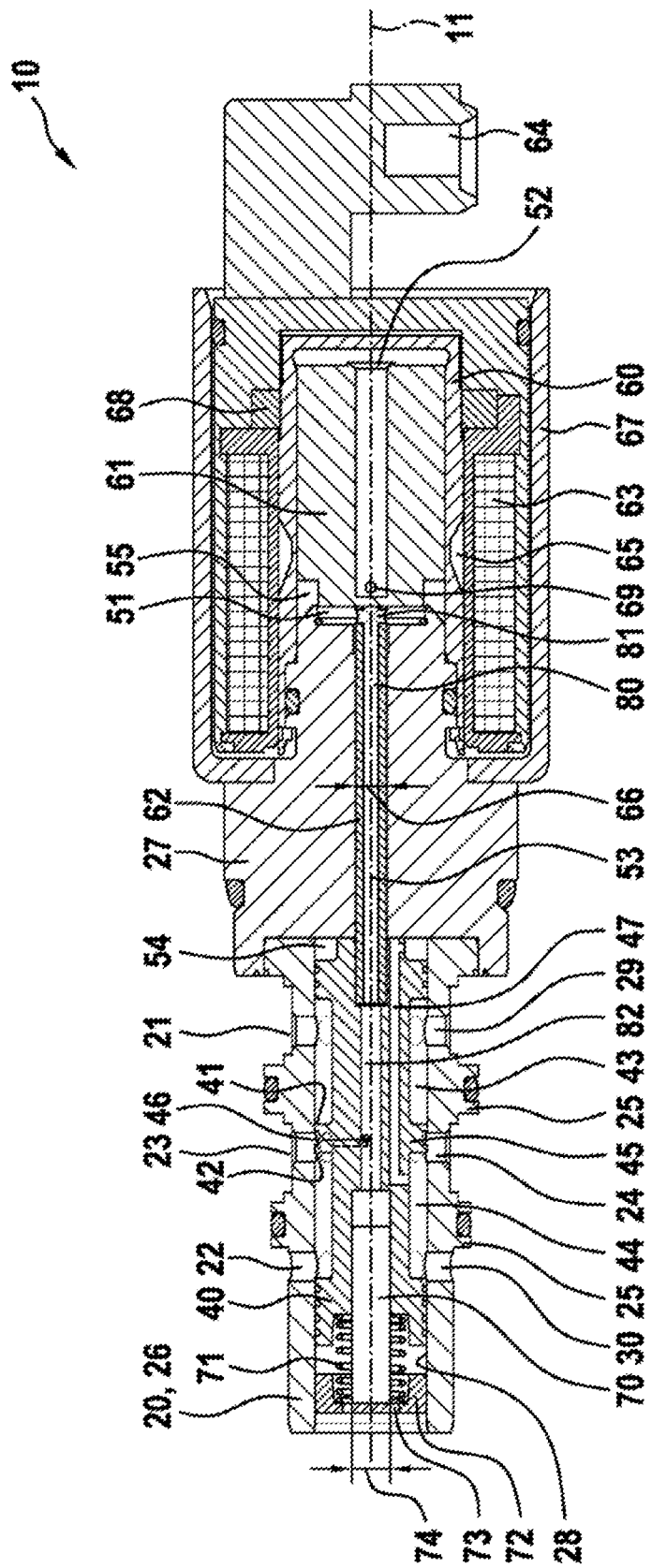

PRESSURE REGULATING VALVE WITH PRESSURE TRANSMISSION PIN

This application claims priority under 35 U.S.C. § 119 to patent application no. DE 10 2017 203 286.3, filed on Mar. 1, 2017 in Germany, the disclosure of which is incorporated herein by reference in its entirety.

The disclosure relates to a pressure regulating valve.

BACKGROUND

Pressure regulating valves typically have an inflow port, a return flow port and an outlet port. By means of a control slide valve actuated by an electromagnet, the pressure at the outlet port is set to a value corresponding to the magnetic force. The corresponding armature is often, as in U.S. Pat. No. 5,571,248 or DE 10 2014 004 796 A1, for instance, surrounded by the pressure at the return flow port. The pressure around the armature is hence comparatively low. Air bubbles in the pressure fluid around the armature are hence not automatically conveyed out of the pressure regulating valve. Rather, a complex bleeding is necessary.

In addition, in pressure regulating valves the pressure at the work port typically produces at the control slide valve a force directed in the direction of the longitudinal axis. For this purpose, for instance from U.S. Pat. No. 5,571,248, a pressure transmission pin, which at one longitudinal end projects into the control slide valve, is known. The control slide valve is designed such that the pressure at the outlet port effectively acts only on an area of the control side valve which is equal to the cross-sectional area of the pressure transmission pin.

In the pressure regulating valve according to EP 1 209 327 A2, on the outer peripheral surface of the control slide valve is instead provided a leap in diameter, wherein effectively only the appropriate annular surface is pressurized by the pressure at the outlet port. The drawback of this solution consists in said annular surface being comparatively large. Should it be wished to reduce the size of this, then the leap in diameter would have to be chosen so small that it can no longer be produced in a process-reliable manner. By contrast, the abovementioned pressure transmission pin can have a very small cross-sectional area. In EP 1 209 327 A2, the armature is surrounded, furthermore, by the pressure at the work port, so that EP 1 209 327 A2 is regarded as the closest prior art.

SUMMARY

One advantage of the present pressure regulating valve consists in the fact that a manual bleeding of the first and/or the second fluid space, which are defined by the armature, is not necessary. Rather, air bubbles which are trapped there in the pressure fluid are automatically conveyed out of the pressure regulating valve. The pressure fluid is preferably constituted by a liquid, and most preferably by hydraulic oil. In addition, the electromagnetic actuation can be designed particularly small, or the pressure at the outlet port can be chosen high. In particular, the effective area over which the pressure at the outlet port acts on the control slide valve can be chosen small, yet the pressure regulating valve can still be produced in a process-reliable manner.

According to the disclosure, it is proposed that the third fluid space is delimited in some sections by a pressure transmission pin, which extends with a constant second outer cross-sectional shape in the direction of the longitudinal axis, wherein the pressure transmission pin, with its end facing toward the armature, projects into the control slide valve, wherein it is supported, with its end facing away from the armature, at least indirectly against the housing, wherein a hydraulically effective area of the second outer cross-sectional shape is larger than a hydraulically effective area of the first outer cross-sectional shape. In contrast to U.S. Pat. No. 5,571,248, the effective area on which the pressure at the outlet port acts is not produced solely by the pressure transmission pin. Instead, this area is also influenced by the coupling rod. In similar fashion to EP 1 209 327 A2, the coupling rod is used to feed the comparatively high pressure at the outlet port via the third fluid space into the first fluid space.

Ultimately, the pressure at the outlet port produces a force on the control slide valve, which force acts in the direction of the longitudinal axis toward the armature. The magnetic force of the armature acts counter to the aforementioned force. A force equilibrium is established, so that the outlet pressure is proportional to the magnetic force of the armature.

The first fluid space is preferably fluidically connected to the second fluid space, most preferably via bores in the armature. Hence, the movement of the armature is substantially not impeded by the pressure fluid. In the first and in the second fluid space, the pressure at the outlet port acts accordingly. The comparatively high outlet pressure has the effect that smallest air bubbles are reliably conveyed out of the first and the second fluid space respectively.

In the following claims, description and drawing, advantageous refinements and improvements of the disclosure are defined.

It can be provided that the control slide valve is configured such that the hydraulic force exerted by the pressure at the inflow port on the control slide valve in the direction of the longitudinal axis amounts to zero. Hence the pressure regulation is substantially not disturbed by the pressure at the inflow port. Preferably, the control slide valve is accommodated in a slide valve bore which is circular-cylindrical with respect to the longitudinal axis, wherein the control slide valve is provided with a first groove running annularly around the longitudinal axis, wherein the pressure at the inflow port impinges on the control slide valve exclusively on the surface of the first groove.

It can be provided that the control slide valve is configured such that the hydraulic force exerted by the pressure at the return flow port on the control slide valve in the direction of the longitudinal axis substantially amounts to zero. Hence the pressure regulation is substantially not disturbed by the pressure at the inflow port. The fact that the comparatively low pressure at the return flow port effectively acts on the same area as the pressure at the outlet port is acceptable, since the pressure regulation is only marginally influenced hereby. Preferably, the control slide valve is accommodated in a slide valve bore which is circular-cylindrical with respect to the longitudinal axis, wherein the control slide valve is provided with a second groove running annularly around the longitudinal axis, wherein the pressure at the return flow port impinges on the control slide valve on the surface of the second groove. Furthermore, the pressure at the return flow port can impinge on the control slide valve at its two opposite longitudinal ends.

It can be provided that the control slide valve, the coupling rod and the armature are configured such that the pressure at the outlet port acts in the direction of the longitudinal axis effectively on an area difference between the first outer cross-sectional shape and the second outer cross-sectional shape. Accordingly, the control slide valve and the armature are jointly configured, with the exception of the area difference between the first and the second outer cross-sectional shape, such that they are pressure-balanced. The pressure at the outlet port preferably impacts on the control slide valve exclusively in the first, in the second, in the third and, if so desired, in the fifth fluid space.

It can be provided that a first and a second groove jointly delimit a first web on the control slide valve, wherein the first web is provided with at least one first radial bore, which runs transversely to the longitudinal axis and which connects the outlet port to the third fluid space. The first web preferably delimits the first and the second orifice. The first and the second orifice are preferably delimited by at least one second radial bore in the housing. The pressure obtaining in the at least one first radial bore produces no force, directed in the direction of the longitudinal axis, on the control slide valve.

It can be provided that a free cross-sectional area of the first orifice, upon a movement of the control slide valve toward the pole tube, becomes smaller. Upon this movement, the second orifice becomes correspondingly larger. Preferably, either the first or the second orifice is open. A zero overlap is preferably not present.

It can be provided that the coupling rod and the control slide valve are configured separate from each other, wherein they are fixedly connected to each other. Consequently, in the manufacture of the pressure regulating valve, particularly little material has to be removed. It is also conceivable, however, for the coupling rod and the control slide valve to be configured in one piece with each other.

It can be provided that the pole tube is configured separate from the housing, wherein it is fixedly connected to the housing. The armature can hence be installed without difficulty in the pole tube. At the same time, the connection between the housing and the pole tube can be realized in a pressure-tight manner. The pole tube is preferably surrounded by a magnet coil. The magnet coil is preferably surrounded by a coil casing, which most preferably consists of a ferromagnetic material.

It can be provided that the control slide valve, together with the housing, delimits a fourth fluid space, the volume of which is variable by movement of the control slide valve, wherein in the control slide valve is arranged a connecting duct, which fluidically connects the fourth fluid space to the return flow port. The fourth fluid space is preferably arranged at a longitudinal end of the control slide valve, which longitudinal end is facing toward the armature. Due to the connecting duct, the movement of the control slide valve is substantially not impeded by the pressure fluid.

It can be provided that the return flow port, at least in some sections, is arranged at a longitudinal end of the housing, which longitudinal end is facing away from the pole tube. The outlet port is arranged, in the direction of the longitudinal axis, preferably between the inflow port and the return flow port.

Naturally, the above-stated features and the features which are yet to be outlined below are usable not only in the respectively defined combination, but also in other combinations or in isolation, without departing from the scope of the present disclosure.

BRIEF DESCRIPTION OF THE DRAWINGS

The disclosure is explained in greater detail below with reference to the appended drawing, wherein The FIGURE shows a longitudinal section of a pressure regulating valve according to the disclosure.

DETAILED DESCRIPTION

The FIGURE shows a longitudinal section of a pressure regulating valve 10 according to the disclosure, wherein the sectional plane contains the longitudinal axis 11. The pressure regulating valve 10 is configured as a screw-in valve, wherein it is designed for installation in a stepped bore (not represented) in a valve block. It has a housing 20, which is composed of a first and a second housing part 26; 27, which in turn are fixedly connected to each other. The housing 20 can also be configured in one piece, though the present two-part construction is more cost-effective. On the outer peripheral surface of the first housing part 26 are arranged, one after another in the direction of the longitudinal axis, the return flow port 22, the outlet port 23 and the inflow port 21, wherein said ports 22; 23; 21 are demarcated from one another in a fluid-tight manner by second webs 25 running annularly around the longitudinal axis 11. Inside, the first housing part 26 has a slide valve bore 28, which is circular-cylindrical with respect to the longitudinal axis 11 and which can be produced particularly easily. At the (in the FIGURE) left-hand end, a separate support plate 72 is fixedly installed in the slide valve bore 28. The support plate 72 is provided with a plurality of longitudinal bores 73. At the (in the FIGURE) left-hand, open end of the slide valve bore 28, the pressure at the return flow port 22 likewise obtains, which pressure acts via the longitudinal bores 73 on the there-located end face of the control slide valve 40. At the opposite, (in the FIGURE) right-hand longitudinal end of the control slide valve 40 is provided a fourth fluid space 54, in which the pressure at the return flow port 22 likewise obtains, so that the same pressure acts on both end faces of the control slide valve 40. The pressure at the return flow port 22 is preferably low.

The control slide valve 40 has a first and second groove 43; 44, which run annularly around the longitudinal axis 11. The first and the second groove 43; 44 delimit a common first web 45 on the control slide valve 40. Opposite to the first web 45 are arranged a plurality of second radial bores 24, which pass through the housing 40 transversely to the longitudinal axis 11, wherein they lead to the outlet port 23. The second radial bores 24 form together with the first web 45 a first and a second orifice 41; 42, which, upon a movement of the control slide valve 40, are adjusted in opposite directions. Preferably either the first or the second orifice 41; 42 is in this case open, wherein, most preferably, no zero overlap is present. Upon a movement of the control slide valve 40 toward the pole tube 60, the second orifice 42 increases in size, while the first orifice 41 decreases in size.

Via the first orifice 41, the inflow port 21 is fluidically connected to the outlet port 23. In the corresponding fluid flow path, the third radial bores 29 are arranged in the housing 20, which preferably in no setting of the control slide valve 40 are covered. Via the second orifice 42, the return flow port 22 is connected to the outlet port 23. In the corresponding fluid flow path, the fourth radial bores 30 are arranged in the housing 20, which preferably in no setting of the control slide valve 40 are covered.

At the (in the FIGURE) right-hand longitudinal end, a separate pole tube 60 is fastened to the housing 20, wherein the corresponding connection is realized in a fluid-tight manner. The pole tube 60 is of pot-like configuration, so that, at the longitudinal end facing away from the housing 20, it is sealed in a fluid-tight manner. In the pole tube 60 is accommodated a separate armature 61, which is movable in the direction of the longitudinal axis 11. The armature 61 demarcates a first and a second fluid space 51; 52 one from the other in the pole tube 60. These are fluidically connected to each other via bores 69 in the armature 61, so that enclosed pressure fluid does not impede the movement of the armature 61. Due to the step-like construction of the present armature 61, in the left-hand end setting a closed-off fifth fluid space 55 can be formed, which, via said bores 69 in the armature 61, are likewise in fluid exchange connection with the first and the second fluid space 51; 52.

Around the pole tube 60 is arranged a magnet coil 63, which in turn is surrounded by a pot-like coil casing 67. The pole tube 60, the second housing part 27, the coil casing 75 and the pole disk 68 respectively consist of a ferromagnetic material, such as, for instance, steel, wherein they form a magnetic circuit which annularly surrounds the magnet coil 63. In the pole tube 60 is arranged a flow interruption portion 65, which interrupts this magnetic circuit. The flow interruption portion 65 can consist of a nonmagnetic material, such as, for instance, copper. It is also conceivable, however, to realize the wall thickness of the pole tube 60 in the flow interruption portion 65 sufficiently thin that the pole tube 60 enters there into magnetic saturation when the magnet coil 63 is energized. When the magnet coil 63 is energized, there acts on the armature 61 a force which thrusts this in the direction of a setting in which said magnetic circuit is closed via the armature 61. Said force accordingly acts in a direction toward the control slide valve 40. The pole disk 68 is provided with cutouts, through which electric leads are led to the connecting socket 64. The magnet coil 63 and the connecting socket 64 are preferably produced as one in a plastic injection molding process, wherein the pole disk 68 is jointly encapsulated.

The armature 61 is motionally coupled via a separate coupling rod 62 to the control slide valve 40. The coupling rod 62 is in the present case fixedly connected to the control slide valve 40, wherein the corresponding connection is of fluid-tight configuration. For instance, the coupling rod 62 is pressed into a tailor-made recess of the control slide valve 40. According to choice, the coupling rod 62 can bear loosely against the armature 61 or be fixedly connected thereto. It should here be noted that the control slide valve 40 and the coupling rod 62 are pushed by the spring 71 against the armature 61, so that said motional coupling is given. The spring 71 is configured as a helical spring, which is arranged concentrically to the longitudinal axis 11. It is installed, under pretension, between the support plate 72 and the control slide valve 40, wherein it surrounds the pressure transmission pin 70.

The outer peripheral surface of the coupling rod 62 extends with a constant first outer cross-sectional shape along the longitudinal axis 11. The first outer cross-sectional shape is preferably configured circular and concentric to the longitudinal axis 11. The coupling rod 62 is preferably tailored with little play to the housing 20, such that, between the coupling rod 62 and the housing 20, in particular the second housing part 27, substantially no pressure fluid can pass through.

Inside the coupling rod 62 is provided a longitudinal bore 80, which forms a portion of a third fluid space 53. Since the longitudinal bore 80 is preferably configured circular-cylindrically with respect to the longitudinal axis 11. At that longitudinal end of the longitudinal bore 80 which is facing toward the armature 61 is arranged at least one transverse bore 81, so that the third fluid space 53 is fluidically connected to the first fluid space 51. The longitudinal bore 80 in the coupling rod 62 is continued in true alignment by a longitudinal bore 82 in the control slide valve 40, in the direction of the longitudinal axis 11. The longitudinal bore 82 is likewise a component part of the third fluid space 53. In the region of the first web 45, the control slide valve 40 is interspersed by first radial bores 46 transversely to the longitudinal axis 11. Via the first radial bores 46, a fluid exchange connection exists, independently of the setting of the control slide valve 40, between the outlet port 23 and the third fluid space 53. Ultimately, in the first, in the second, in the third and in the fifth fluid space 51; 52; 53; 55, the pressure at the outlet port 23 obtains. The relevant parts are thus broadly pressure-balanced, with respect to this pressure. Only the difference between the area 66 of the first outer cross-sectional shape of the coupling rod 62 and the area 74 of the second outer cross-sectional shape of the pressure transmission pin 70, does a force directed in the direction of the longitudinal axis 11 act on the control slide valve 40. According to the disclosure, the area 74 of the second outer cross-sectional shape is larger than the area 66 of the first outer cross-sectional shape, so that the force produced by the pressure at the outlet port 23 is directed toward the armature 61. Ultimately, the pressure at the outlet port 23 adjusts itself such that said compressive force and the magnetic force of the armature 61 are in equilibrium. Said area difference can here be chosen very small, so that the magnet coil and the armature can likewise be dimensioned small or so that the pressure at the outlet port 23 can be high. Despite this small area difference, a comparatively large diameter difference between the coupling rod 62 and the pressure transmission pin 70, which diameter difference can be produced in a process-reliable manner, is obtained. Should it be wished to provide the corresponding area difference as in EP 1 209 327 A2 on the outer peripheral surface of the control slide valve, an extremely small diameter difference, which can no longer be produced in a process-reliable manner, would be the result.

The pressure transmission pin 70 is configured circular—cylindrically with respect to the longitudinal axis 11. It projects into the control slide valve 40, wherein it is supported at the opposite end against the support plate 72. The pressure transmission pin 70 delimits with an end face, in some sections, the third fluid space 53. The bore 82 in the control slide valve 40 is configured, for the reception of the pressure transmission pin 70, as a stepped bore.

Reference should also be made to the connecting duct 47 in the control slide valve 40, which connecting duct with one end opens out into the second groove 44 and with an opposite end opens out into the fourth fluid space 54. The fourth fluid space 54 is thus in fluid exchange connection with the return flow port 22, as already mentioned above.

REFERENCE SYMBOL LIST

10 pressure regulating valve
11 longitudinal axis
20 housing
21 inflow port
22 return flow port
23 outlet port
24 second radial bore
25 second web
26 first housing part
27 second housing part
28 slide valve bore
29 third radial bore
30 fourth radial bore 40 control slide valve
41 first orifice
42 second orifice
43 third orifice
44 second groove
45 first web
46 first radial bore
47 connecting duct
51 first fluid space
52 second fluid space
53 third fluid space
54 fourth fluid space
55 fifth fluid space
60 pole tube
61 armature
62 coupling rod
63 magnet coil
64 connecting socket
65 flow interruption portion
66 hydraulically effective area of the first outer cross-sectional shape
67 coil casing
68 pole disk
69 bore
70 pressure transmission pin
71 spring
72 support plate
73 longitudinal bore
74 hydraulically effective area of the second outer cross-sectional shape
75 coil casing
80 longitudinal bore in the coupling rod
81 transverse bore
82 longitudinal bore in the control slide valve

What is claimed is:

1. A pressure regulating valve, comprising:
a housing including:
an inflow port;
a return flow port; and
an outlet port;
a control slide valve positioned in the housing and movable along a direction of a longitudinal axis, the control slide valve and the housing together forming a first orifice and a second orifice that each have a cross-sectional area that is adjustable in opposite directions via movement of the control slide valve, wherein:
the inflow port is fluidically connected to the outlet port via the first orifice; and
the return flow port is fluidically connected to the outlet port via the second orifice;
a pole tube;
an armature that is positioned in the pole tube and movable along the direction of the longitudinal axis, and that demarcates a first fluid space and a second fluid space from each other within the pole tube such that the first fluid space and the second fluid space each have a volume that is adjustable in opposite directions via displacement of the armature;
a coupling rod that extends with a constant first outer cross-sectional shape in the direction of the longitudinal axis, and that motionally couples the armature with the control slide valve, wherein:
at least inner sections of the coupling rod and the control slide valve together at least partially delimit a third fluid space that extends in the direction of the longitudinal axis; and
the third fluid space fluidically connects the first fluid space to the outlet port; and
a pressure transmission pin that extends with a constant second outer cross-sectional shape in the direction of the longitudinal axis, and that includes:
a first end facing toward the armature and projecting into the control slide valve; and
a second end facing away from the armature and positioned so that the pressure transmission pin is at least indirectly supported against the housing;
wherein a hydraulically effective area of the second outer cross-sectional shape is larger than a hydraulically effective area of the first outer cross-sectional shape.

2. The pressure regulating valve of claim 1, wherein the control slide valve is configured such that a hydraulic force exerted on the control slide valve at the inflow port in the direction of the longitudinal axis is zero.

3. The pressure regulating valve of claim 1, wherein the control slide valve is configured such that a hydraulic force exerted on the control slide valve at the return flow port in the direction of the longitudinal axis is approximately zero.

4. The pressure regulating valve of claim 1, wherein the control slide valve, the coupling rod, and the armature are configured such that a pressure at the outlet port acts in the direction of the longitudinal axis on an effective area defined by a difference in area between the first outer cross-sectional shape and the second outer cross-sectional shape.

5. The pressure regulating valve of claim 1, wherein movement of the control slide valve toward the pole tube causes a free cross-sectional area of the first orifice to decrease.

6. The pressure regulating valve of claim 1, wherein the coupling rod and the control slide valve are separate elements that are fixedly connected to each other.

7. The pressure regulating valve of claim 1, wherein the pole tube and the housing are separate elements that are fixedly connected to each other.

8. The pressure regulating valve of claim 1, wherein:
the control slide valve includes a connecting duct;
the control slide valve and the housing together delimit a forth fluid space having a volume that is variable via movement of the control slide valve; and
the forth fluid space is fluidically connected to the return flow port via the connecting duct.

9. The pressure regulating valve of claim 1, wherein at least sections of the return flow port are located at a longitudinal end of the housing facing away from the pole tube.

10. A pressure regulating valve, comprising:
a housing including:
an inflow port;
a return flow port; and
an outlet port;
a control slide valve positioned in the housing and movable along a direction of a longitudinal axis, the control slide valve and the housing together forming a first orifice and a second orifice that each have a cross-sectional area that is adjustable in opposite directions via movement of the control slide valve, wherein:
the inflow port is fluidically connected to the outlet port via the first orifice; and
the return flow port is fluidically connected to the outlet port via the second orifice;
a pole tube;
an armature that is positioned in the pole tube and movable along the direction of the longitudinal axis, and that demarcates a first fluid space and a second fluid space from each other within the pole tube such that the first fluid space and the second fluid space each have a volume that is adjustable in opposite directions via displacement of the armature;
a coupling rod that extends with a constant first outer cross-sectional shape in the direction of the longitudinal axis, and that motionally couples the armature with the control slide valve, wherein:
 at least inner sections of the coupling rod and the control slide valve together at least partially delimit a third fluid space that extends in the direction of the longitudinal axis; and
 the third fluid space fluidically connects the first fluid space to the outlet port; and
a pressure transmission pin that extends with a constant second outer cross-sectional shape in the direction of the longitudinal axis, and that includes:
 a first end facing toward the armature and projecting into the control slide valve; and
 a second end facing away from the armature and positioned so that the pressure transmission pin is at least indirectly supported against the housing;
wherein a hydraulically effective area of the second outer cross-sectional shape is larger than a hydraulically effective area of the first outer cross-sectional shape;
wherein the control slide valve, the coupling rod, and the armature are configured such that a pressure at the outlet port acts in the direction of the longitudinal axis on an effective area defined by a difference in area between the first outer cross-sectional shape and the second outer cross-sectional shape; and
wherein the control slide valve includes a first groove and a second groove that together delimit a first web having at least one first radial bore running transversely to the longitudinal axis and connecting the outlet port to the third fluid space.

11. The pressure regulating valve of claim 10, wherein the control slide valve is configured such that a hydraulic force exerted on the control slide valve at the inflow port in the direction of the longitudinal axis is zero.

12. The pressure regulating valve of claim 10, wherein the control slide valve is configured such that a hydraulic force exerted on the control slide valve at the return flow port in the direction of the longitudinal axis is approximately zero.

13. The pressure regulating valve of claim 10, wherein movement of the control slide valve toward the pole tube causes a free cross-sectional area of the first orifice to decrease.

14. The pressure regulating valve of claim 10, wherein the coupling rod and the control slide valve are separate elements that are fixedly connected to each other.

15. The pressure regulating valve of claim 10, wherein the pole tube and the housing are separate elements that are fixedly connected to each other.

16. The pressure regulating valve of claim 10, wherein:
the control slide valve further includes a connecting duct;
the control slide valve and the housing together delimit a forth fluid space having a volume that is variable via movement of the control slide valve; and
the forth fluid space is fluidically connected to the return flow port via the connecting duct.

17. The pressure regulating valve of claim 10, wherein at least sections of the return flow port are located at a longitudinal end of the housing facing away from the pole tube.

* * * * *

UNITED STATES PATENT AND TRADEMARK OFFICE
CERTIFICATE OF CORRECTION

PATENT NO. : 10,544,877 B2
APPLICATION NO. : 15/909343
DATED : January 28, 2020
INVENTOR(S) : Liebhart Zaiser It is certified that error appears in the above-identified patent and that said Letters Patent is hereby corrected as shown below:

In the Claims

In Claim 8, at Column 8, Line 41: "forth fluid space" should read --fourth fluid space--.

In Claim 8, at Column 8, Line 43: "forth fluid space" should read --fourth fluid space--.

In Claim 16, at Column 10, Line 25: "forth fluid space" should read --fourth fluid space--.

In Claim 16, at Column 10, Line 27: "forth fluid space" should read --fourth fluid space--.

Signed and Sealed this
Twenty-fourth Day of March, 2020

Andrei Iancu
*Director of the United States Patent and Trademark Office*